Figure 1:
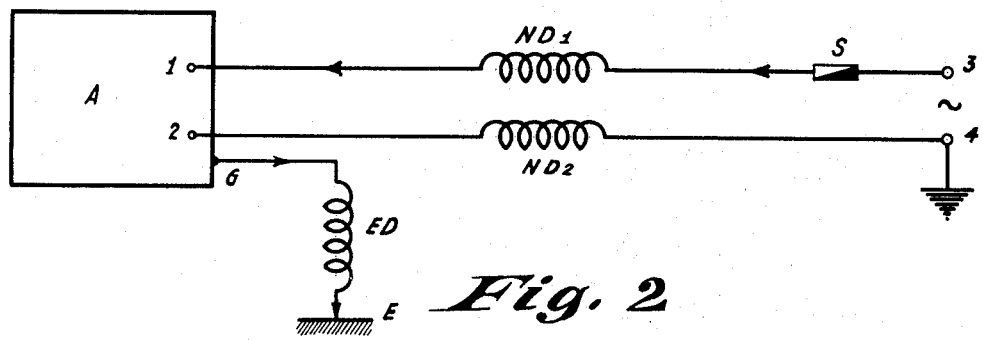

Aug. 8, 1933.                K. H. KRAMBEER                1,921,830
                        PROTECTIVE GROUND CONNECTION
                            Filed Aug. 6, 1931

Inventor
Karl Heinrich Krambeer
BY
ATTORNEY

Patented Aug. 8, 1933

1,921,830

UNITED STATES PATENT OFFICE 1,921,830

PROTECTIVE GROUND CONNECTION

Karl Heinrich Krambeer, Berlin-Wilmersdorf, Germany, assignor to Siemens & Halske, Aktiengesellschaft, Siemensstadt near Berlin, Germany, a Corporation of Germany Application August 6, 1931, Serial No. 555,514, and in Germany September 26, 1930

3 Claims. (Cl. 175—294)

The object of this invention is concerned with an arrangement adapted to ground the boxes or casings of electrical apparatus in such a way that injuries and damages liable or likely to happen in the usual arrangements as a result of short-circuits between live parts and the case are precluded.

Arrangements are known in the earlier art in which the box is earthed by way of a choke-coil. Another known scheme is to unite the apparatus with the network by way of choke-coils. But arrangements of this kind involve the demerit that upon the production of a defect, say, by that one of the line-poles short-circuits with the housing there arises a fault current which owing to the inductive reactance of the line and ground choke-coils, or both, lies but little above the normal working current. Inasmuch as it is not always possible for reasons of working safety to so adjust or choose safety means designed to safeguard the installation, e. g., fuses or maximum-load circuit-breakers that the strength of current where response or tripping is caused will lie sufficiently close to the normal strength of current, there exists a danger of such a faulty current, being but little larger than the normal working current, being allowed to flow and persist for some considerable length of time, with an incidental risk of damage.

According to this invention this drawback is avoided by that ground choke-coil and network choke-coils are combined in such a manner that they will present joint paths of the force-lines. For carrying this basic idea into practice, fundamentally speaking, there are two possibilities, to wit: Both coils could be wound in such a way or sense that the mmf's produced by the windings under the influence of the faulty current are added to each other, or else so wound that they are subtracted from each other. In the former instance conditions will be so that the faulty current finds an increased inductance so that in this manner the current is limited to a definite harmless value. Hence, while in this form of construction no responding of the safety means, fuses, etc., will be occasioned, it will nevertheless be noted that the maximum strength of current liable to arise will be reduced.

However, it is the second embodiment of the scheme that offers particular merits in which the mmf's become subtracted from each other. What is the result of such subtraction is that the flux becomes of lower value than in the case where the network and the grounding inductance are separated from each other. Such reduction in the flux means a decrease in inductance of the series arrangement comprising network and grounding choke-coils. Such decrease in inductive reactance in turn manifests itself by a growth of the faulty current. Hence, the final result of this scheme is that upon the production of a short-circuit between terminal and casing a very heavy faulty current will eventually be caused or allowed to flow. However, inasmuch as this means an immediate operation of the safety elements, such a heavier current of short or transient duration is unable to result damage to the same extent as a current of lower strength, though longer duration.

The idea underlying the present invention is explained more clearly in what follows by reference to the attached drawing. Fig. 1 shows the fundamental idea of a ground connection of the kind heretofore mostly used, while Figs. 2 and 3 are embodiments by way of example of a ground connection according to this invention.

Referring to Fig. 1, A denotes an electrical apparatus which by the aid of its terminals 1 and 2, by way of network choke-coils ND1 and ND2 and a safety element S is united with the supply-line terminals 3 and 4. The casing is connected with ground E at point G, a grounding coil ED being provided for some reason or another inherent in or connected with the essential nature of the apparatus A. Suppose terminal 4 is grounded at the central so that also point 2 is practically at ground potential. If, then, a short-circuit arises between terminal 1 and the casing as indicated in the illustration by an arrow, a faulty current will be caused to flow from terminal 3 by way of the fuse S, network choke-coil ND1, terminal 1, through the short-circuit, casing G and the grounding choke-coil ED to earth E. The size of this current, as above indicated, is essentially limited by the inductive reactance of the two coils ND1 and ND2, ED being arranged in series so that the disadvantages before referred to will arise.

Figure 2:
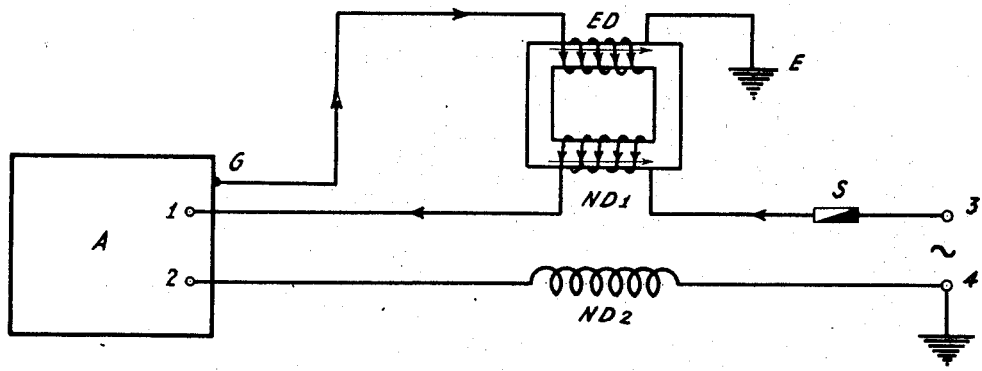

Fig. 2 shows in what way the said difficulty may be overcome according to this invention. In this case the winding of the grounding choke-coil is placed upon the core of network choke-coil ND1, in this particular instance in such a way that the mmf's will be caused to counteract each other. Now, if a short-circuit is produced as indicated again by the arrow, then a faulty current will be caused to flow from 3 by way of S, ND1, 1, G, ED to ground. The direction of the two mmf's for a given instant is indicated by arrows. The decrease in inductance thus insured allows of the flow of a heavy current which will cause S to be rendered operative.

Figure 3:
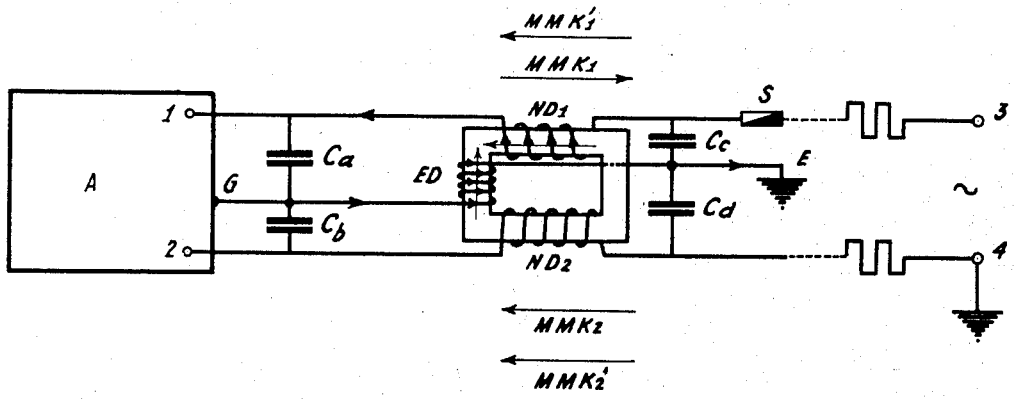

Fig. 3 shows the application of the basic idea of the invention to a special case which is of especially great practical importance; what is involved here is the grounding of an apparatus A which is liable to send out radio frequency currents. In order that the sending of such disturbing currents may be avoided, the network or supply-line in the first place is protected by grounding reactors ND1 and ND2, while, on the other hand, the apparatus is furnished with a protective housing which from point G may be kept at a fixed potential of desired value. The radio frequency disturbances which tend to pass into the supply line by way of the network connecting lines, and which are precluded therefrom by the action of the network choke-coils depart from terminals 1 and 2 with approximately the same amplitude and phase. Hence, they travel through the network reactors from the left towards the right-hand side.

As can be seen from the direction of winding shown in the drawing, these currents result in mmf's having directions being shown above and below the ND1 and ND2 only for a definite instant by the arrows MMK1 and MMK2. These mmf's boost each other, and the result is that the network choke-coil for these radio frequency currents starting from A offers a very high inductive reactance, with the further result that these disturbing currents are kept away from the supply-line. For the supply-line current flowing from the apparatus A by way of the terminals 3 and 4, the network choke-coil does not offer any appreciable resistance. The directions of the mmf's generated by the load curent at a definite instant shall again be denoted above and below the figure by the arrows MMK1' and MMK2', it being presupposed that the direction of the current at this instant is from 3 by way of ND1, 1, 2, and ND2 to terminal 4. The flux produced by the difference of the said forces, in the presence of symmetric choke-coil construction, is practically equal to zero so that also the inductive reactance of the choke-coil becomes but low for the load current. If, then, the casing is grounded from its point G directly or by way of a special choke-coil—and this scheme distinguishes itself from that in Fig. 3—and if a short-circuit arises between the terminal 1 and the casing, then a faulty current will flow from 3 by way of ND1, 1, and G to ground. For this current starting from the terminal 3 there arises no compensating effect in the winding ND2 inasmuch as it does not flow therethrough; as a result the inductive reactance of the path of the current grows to very high proportions so that the disadvantages above referred to will arise. But if, in accordance with this invention a choke-coil is inserted in the grounding connection which forms common force-lines with the network choke-coil, for instance, in a way as illustrated in Fig. 3, by disposing them upon a joint core, the grounding choke-coil may be wound in such a direction that the compensating action of the network choke-coil ND2 will be compensated.

Let us assume again, for a definite instant, a direction of the faulty current going from 3 by way of ND1, 1, G, and ED to ground E. Then, as a result of the direction of winding as above suggested and shown in the drawing, mmf's will be set up which are caused to counteract each other as indicated by arrows inside the two coils. It will be noted that in this manner the desired decrease in inductance is insured again. It will be evident that also in this instance, as pointed out above, the sense of winding of the grounding choke-coil may be so chosen that a growth of inductance will be brought about with a consequent decrease in the strength of the faulty current.

The condensers Ca and Cb, Cc and Cd, as is well known in the art, serve the purpose to compensate for such dissymmetries as may exist in the radio frequency currents when leaving the terminals 1 and 2. The proportions of the condensers and of the coil ED are so selected that the wattless current flowing in series through the condenser Ca and the parallel arrangement of Cb and ED causes falls of potential of such size that point G will be practically at ground potential.

To illustrate the applicability and usefulness of the basic idea of the invention three instances have been treated in what precedes in which a single network coil and two network coils respectively, have been combined with a single grounding reactor. But it will be understood that the basic idea of the invention is utilizable similarly also in systems comprising a greater number of network choke-coils, as is true, e. g., of three-phase systems; and if need be the grounding reactor could be split for this purpose.

The practical examples hereinbefore cited and described could be modified also in other regards whenever particular effects are to be attained. For example, it may often be found advantageous to tune network or grounding choke-coils by the aid of condensers to a definite resonance frequency, say, the network or supply-line frequency, either in this way that the resonant circuit acts as a stopper or inversely in this manner that only the resonance frequency is allowed to pass. Such tuning of the choke-coils, as to the rest, in addition to the cases here described, will often be found suitable in instances where network and grounding reactors are not combined with one another.

It is known in the prior art to tune network choke-coils by the series connection of condensers to supply-line frequency. In this way all other frequencies, especially troublesome waves, will be kept off, where the impedance for the currents of line-frequency will be very low.

As can be seen from the fundamental discussion at the outset of this specification this may be summarily said respecting the invention that the combination of grounding choke-coil and network choke-coils may be used to advantage in such instances where a compensating or reinforcing effect by a faulty current as regards the line inductances is desirable.

I claim:

1. In electrical systems wherein electrical operating apparatus is connected to a source of electrical energy through a network including choke windings and in which the electrical operating devices are provided with a grounded protection casing, a circuit breaker device located in said network and adapted to become operative to disconnect the electrical operating apparatus from the source whenever the current flow in the network due to an abnormal condition in the system becomes substantially excessive as when a short circuit exists between the network and the grounded casing, a choke-coil associated with said grounding connection and cooperating with at least one of the choke windings in said network, for reducing the impedance of the network choke winding while said short circuit exists thereby temporarily increasing the flow of current in said network to assure prompt operation of the circuit breaker.

2. In a system as described in the next preceding claim wherein the associated choke winding and choke coil are wound around a common core in such a way that the magneto motor force resulting from a flow of current in each coil are in opposition.

3. In a system as described in claim 1 in combination with means for tuning the associated choke-coils to a resonant frequency equal to the frequency of the current flowing in the network.

KARL HEINRICH KRAMBEER.